US005153628A

United States Patent [19]

Grasser et al.

[11] Patent Number: 5,153,628

[45] Date of Patent: Oct. 6, 1992

[54] TEMPERATURE CONDITIONING DEVICE FOR INSTANT FILMS

[76] Inventors: Ernst Grasser, Kunigundenstr. 54, 8000 Munich 40; Gert Muller, Scharfreiterplatz 7, 8000 Munich 90, both of Fed. Rep. of Germany

[21] Appl. No.: 712,126

[22] Filed: Jun. 7, 1991

[30] Foreign Application Priority Data

Jun. 8, 1990 [DE] Fed. Rep. of Germany ....... 4018405

[51] Int. Cl.[5] .............................................. G03B 19/00

[52] U.S. Cl. .................................................... 354/354

[58] Field of Search .................. 355/30; 354/299, 302, 354/354

[56] References Cited

U.S. PATENT DOCUMENTS 3,153,376 10/1964 Miller ................................. 354/302

FOREIGN PATENT DOCUMENTS 63-158549 7/1988 Japan .

1115996 6/1968 United Kingdom .

*Primary Examiner*—L. T. Hix

*Assistant Examiner*—D. Rutledge

*Attorney, Agent, or Firm*—Thomas R. Vigil

[57] ABSTRACT

The temperature conditioner device for use with photographic equipment that uses self-developing film using the diffusion transfer process comprises a processor including a thermal insulated housing having at least one opening in a wall of said housing for inserting an exposed photograph and at least one compartment for accommodating the photograph, means for controlling the internal temperature and means for measuring and indicating the internal temperature, as well as a thermal case for receiving the processor and at least one spare film, whereby the thermal case also includes means for warming up.

16 Claims, 2 Drawing Sheets

TEMPERATURE CONDITIONING DEVICE FOR INSTANT FILMS

BACKGROUND AND SUMMARY OF THE INVENTION

In professional photography, an instant photograph is frequently made of the subject so that the operator may check composition, exposure time and other camera settings on his final camera photograph prior to taking the final photograph, of which the operator will not see a copy until his film is developed in the laboratory. A high quality instant photograph, however, can only be obtained if the instant development process takes place under proper conditions of ambient temperature, namely 23°-24° C. In the case of nonprofessional photography where high quality of the finished photograph may not be crucial, the manufacturer advises that the development process may begin, though slowly, in temperatures as low as 13° C. At lower temperatures the manufacturer of the film recommends that the exposed instant negative be placed in a warm pocket of the operator's clothing. Professional photographers find the latter procedure unsatisfactory, since, among other problems, they cannot control the temperature of 23°-24° C. necessary for optimum results.

Maintaining an environment of 23°-24° C. can be exceedingly difficult during photographic work out of doors, in the winter or at high elevations in the mountains, making it almost impossible to obtain a clean, high-resolution instant photograph.

The same problem exists with respect to unexposed film if the latter has cooled to a temperature below 23°-24° C., especially below 13° C., even if the instant negative is developed under perfect conditions following exposure.

It is a feature of the invention to enable the photographer to "temperature condition" his film both prior to and after exposure so that he may obtain satisfactory, high quality instant photographs in an environment of temperatures below 23° C., and especially below 13° C.

This is accomplished by the invention in that it provides a thermally insulated case (hereafter called "Thermal Case") for the warm storage of unexposed films as well as a developing box in which an exposed film is developed, or processed (hereafter called "Processor"), a detailed description of which follows below.

The Processor contains a heat source and is equipped with the means to control its internal temperature and maintain it between 20° and 24° C. It also provides space for at least two instant negatives during development. Further, the invention provides means by which the temperature inside the Processor can be measured and indicated externally. The Processor, on its front panel also features at least one slot through which the negative can be inserted into a space inside the Processor, which is formed between the wall of the housing and a Holder for the Warming Element of the Processor.

The Thermal Case and the Processor are equipped with a device for measuring and indicating its internal temperature, and each contain a package of a heat releasing chemical substance in powder form which is referred to as the Warming Element. When the chemical substance is exposed to air, it releases heat sufficient to obtain the desired temperatures. The Warming Element is held in place inside the Processor by a Holder made, for instance, out of perforated or slotted metal shaped into a compartment.

Instead of the Warming Element having an air-activated chemical substance, other heat sources may be used, as long as they release a sufficient amount of heat for the desired duration. Such other heat sources may be based on the burning of fuel or gas, such as in lighters of various kinds or based on electrical power.

The perforated or slotted metal which forms the compartment holding the Warming Element is made from sheet metal stock of commonly used thicknesses, namely between 0.2 and 2 mm. A wall thickness of 1 mm or even a little more is preferred, since the extra thickness allows the metal to act as a buffer between the heat source and the film. However, the metal should not be so thick so as to become a factor in the overall weight of the device. Therefore a metal thickness between 0.8 and 1.5 mm is preferred.

The device for measuring and indicating the internal temperature of the Thermal Case and the processor may comprise an ordinary thermometer arranged for measuring the temperature on its inside, while it indicates the inside temperature outside of the device. The temperature indicator can be arranged to read only the temperature range of concern, namely 13° to 25° C. for the Thermal Case and 20° to 25° C. for the Processor. The preferred type of temperature measuring and indicating device, however, is a commercially available electronic thermometer. The temperature sensor of this type of thermometer can be arranged inside of each, the Thermal Case and the Processor, in such a position that it measures the temperature where it is most critical, namely on the outside of the compartment holding the Warming Element. Experience has shown that the temperature taken at that location is the same as that prevalent throughout the remainder of the interior, because the thickness of the sheet metal used for the construction of the compartment, especially if the Holder for the Warming Element is designed so that the element does not come into direct contact with the sheet metal. The outside of the sheet metal then has the same temperature as the remainder of the interior of the Processor.

The essential component of the Temperature Conditioning device for instant films is the Processor, which is thermally insulated and made in such dimensions as to allow the insertion of two pictures through slots provided for the purpose. The thermally insulated Processor, equipped with an external temperature indicator also contains a Warming Element for conditioning the desired temperature of 23° to 24° C. This Warming Element in the form of a package or pad, is placed inside the metal compartment, either in the middle of the Processor, with one slot on either side of the metal compartment for the insertion of two negatives at the same time, or flat against the inside of one wall of the housing of the processor with a slot between the metal compartment and the outer wall of the housing of the processor for the insertion of one negative. It has been determined that during the short time while the film is in the camera, it may cool to temperatures of 15° or 13° C. After the exposed piece of film is inserted into one of the slots for development, condensation may occur, because the cool film is introduced into the warm environment of 23° to 24° C. inside the Processor. Therefore, a package of a drying medium such as Silica-Gel for absorbing the moisture can be provided inside the Processor. The same result may be accomplished by fastening a piece of blotter paper to the inside wall of the case against which the negative brushes as it is inserted, thereby removing the moisture.

Controlling the temperature inside the case, if too high, is best accomplished by providing a door to open the case, which is necessary anyway in order to allow the insertion and removal of the Warming Element. A hinged door can be provided at the backside of the Processor which, when opened, will cause warm air to escape from the Processor. If necessary, the temperature can be raised by opening the door and blowing air in the Warming Element. The added supply of oxygen will cause the heat releasing chemical substance inside the Warming Element to increase its activation and therefore to release more heat.

The Warming Element, described as the preferred heat source, comprises a package or pad which is available under different names, but all generally containing iron powder, water, salt, activated charcoal and wood fibers which start a chemical reaction when combined and exposed to air and release heat. To activate the ingredients packed in a bag made of a porous fabric, the outer, airtight wrapper is removed and the inner bag is shaken so as to ensure the access of air, especially oxygen to all of the contents. When the package begins to feel warm, it is ready for insertion into the Thermal Case or the Processor.

The dimensions of the Thermal Case and the Processor are predetermined by the size of the items which they are intended to accommodate. The Thermal Case, in order to hold the Processor and several packets of film, requires internal dimensions of from 10 cm×25 cm to 5 cm×30 cm with a height of about 25 cm and should be insulated with a layer of plastic foam insulation approximately 4 to 5 cm thick. The plastic foam insulation, for protection and enhanced appearance, may be covered with a synthetic foil or a fabric.

The portion of the interior of the Thermal Case occupied by the Processor measures approximately 15 cm×17 cm or 15 cm×18 cm with a height of about 10 cm. The Processor itself has internal dimensions to readily accommodate two instant negatives. Two independent slots are provided for the insertion of two instant negatives with the Holder for the Warming Element between them. The case must also have room for the temperature sensor for the external Temperature Indicator.

This corresponds to internal dimensions of about 10 cm×13 cm with a height of 3-5 cm, depending on whether the device has 1 slot for one negative or 2 slots for two negatives.

The Processor is well insulated on all sides with a good insulating material such as Styrofoam ™ whereby, as mentioned above, the backside is fashioned into a hinged access door which is also well insulated. The device for measuring and indicating the internal temperature is of a common electronic type, the indicator for which is preferably located at the front side of the Processor and between the two slots. The temperature sensor itself is installed as closely as possible to the negative so that the temperature during the development process can be accurately measured.

The Styrofoam ™ sheet used for the insulation of the interior of the Processor is about 2-3 cm thick, although that thickness may be varied. This Styrofoam ™ sheet is readily available.

The Holder for the Warming Element and, if needed, the drying medium, is cut from perforated metal and installed, in the case of a device built to accommodate a single negative, near the center of the interior, so as to separate the Warming Element and, if needed, the drying medium, on one side and the negative, on the other side.

In the preferred embodiment with two slots, two pieces of perforated metal are installed in the center, spaced apart sufficiently to accommodate the Warming Element and, if needed, the drying medium, between them. The sensor for the Temperature Indicator is placed so that it does not come into direct contact with the Warming Element, but in an optimal position to measure the temperature to which the negative will be exposed as accurately as possible.

The device for measuring and indicating the internal temperature is a common electronic thermometer, selected to give particularly accurate readings, in tenths of a degree, in the 20° to 25° C. range, and especially between 23° and 24° C. For the Thermal Case, the accuracy of the electronic thermometer is less critical. Here, indications by full degrees C. are sufficient, ideally between 10° and 25° C. In practice, however, indications by full degrees are needed only for the range of from 15° to 25° C., since temperatures in the Thermal Case should not be below 15° nor above 25° C.

In this manner, optimal results will be achieved in the developing process, since the negative material will not be exposed to temperatures below the minimum of 15° to 18° C. In fact, temperatures can be controlled and held to the desirable range of from 20° to 24° C., or even to the ideal range of from 23° to 24° C.

For practical reasons, both the Thermal Case and the Processor should be equipped with the same model of an electronic thermometer, which is readily available with readouts in tenths of a degree in the 10° to 30° C. range. The electronic thermometer is particularly practical on the Thermal Case, since the indicator can easily be installed externally, while placing the sensor on the inside requires only a very small hole. As a result, the insulating properties of the thermal material are not compromised.

While the Processor is not in use, it is stored in the Thermal Case. Upon removal, the temperature is read. If the indicator indicates a temperature below 23° to 24° C. in the interior of the case, the operator may blow on the Warming Element to increase the activation. If the temperature is too high, he may open the access door to allow cold outside air to cool down the inside. Should the initial temperature in the Processor exceed the 24° C. mark by more than 2° to 3° C. the operator may briefly remove the Warming Element from the case. This will result in a rapid drop in temperature in the interior of the case. When not in use, but while containing an activated Warming Element, the Processor should always be kept in the Thermal Case, to hold heat loss to a minimum.

BRIEF DESCRIPTION OF THE DRAWINGS

The attached drawings show the Thermal Case and the Processor. The latter is useable without the former.

DESCRIPTION OF THE PREFERRED EMBODIMENT(S)

Figure 1:
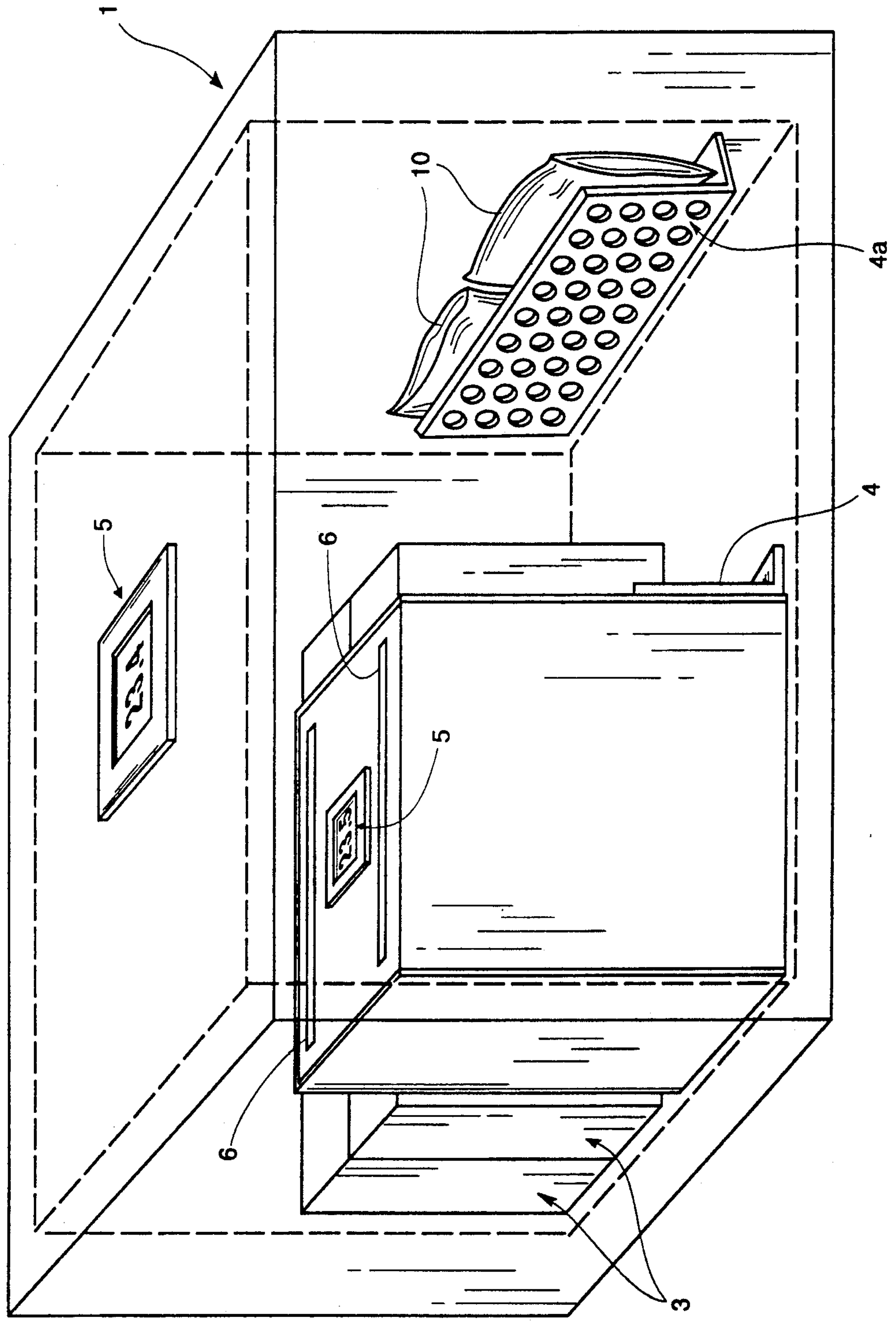
FIG. 1 is a perspective view of the Thermal Case of the invention and shows in the interior of the Thermal Case, the Processor, two spare films and the Holder for the Warming Element.

FIG. 1 shows a Thermal Case 1, with the positions indicated for its normal contents, namely a Processor 2 and two packs of film 3. The Processor 2 is preferably stored in its holder with a temperature indicator 5 at the top, so that the internal temperature of the Processor 2 can be read as soon as the Thermal Case 1 is opened. The Thermal Case 1 features a Holder 4A for a Warming Element 10.

Figure 2:
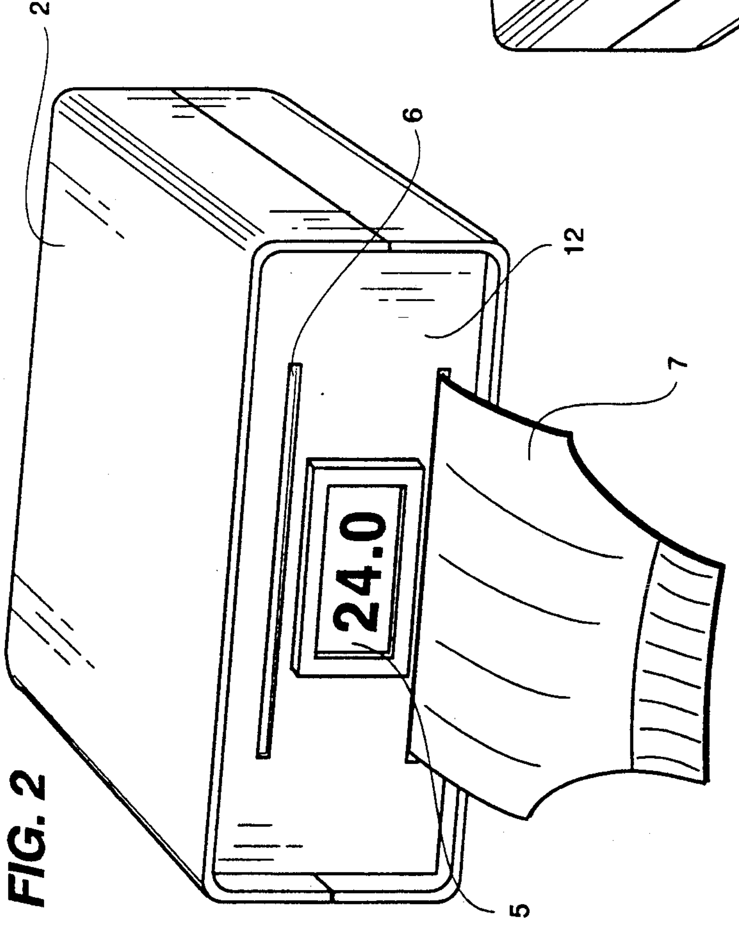
FIG. 2 is a perspective view of the Processor and shows the exterior of the Processor with a temperature indicator, and an upper slot empty and a lower slot with a negative inserted.

The Processor 2 as shown in FIG. 2, has inside dimensions of about 10 cm in width, 12.5 to 13 cm in depth and about 4.5 to 5 cm in height, since it is designed for two negatives 7. The preferred format, as shown in FIG. 2, has two parallel slots 6 to accept the two negatives 7. Between the slots 6 and on the inside of the housing, a compartment 8 is formed from perforated or non-perforated metal, the front edge of which is bent 90° outward to facilitate the insertion of the Warming Element 10 and to avoid tearing of the Warming Element (package) 10 during the insertion. As mentioned, the metal may be of common thickness, 0.2 to 2 mm and may have round or square holes or it may be slotted. Its preferred thickness is 1 mm. The height of the perforated metal compartment 8 is about 2.5–3 cm, allowing for the easy insertion of one or even two Warming Elements 10, which are normally between 5 and 10 mm thick. This still leaves room for a package of a drying medium, such as Silica-Gel.

A temperature sensor of an electronic thermometer is attached close to the outside surface of the metal compartment 8. The indicator 5 of the electronic thermometer is installed between the two slots 6. A readily available temperature indicator 5 has a clear cover with a frame measuring about 3 cm×5 cm, which fits easily between the two slots 6.

Figure 3:
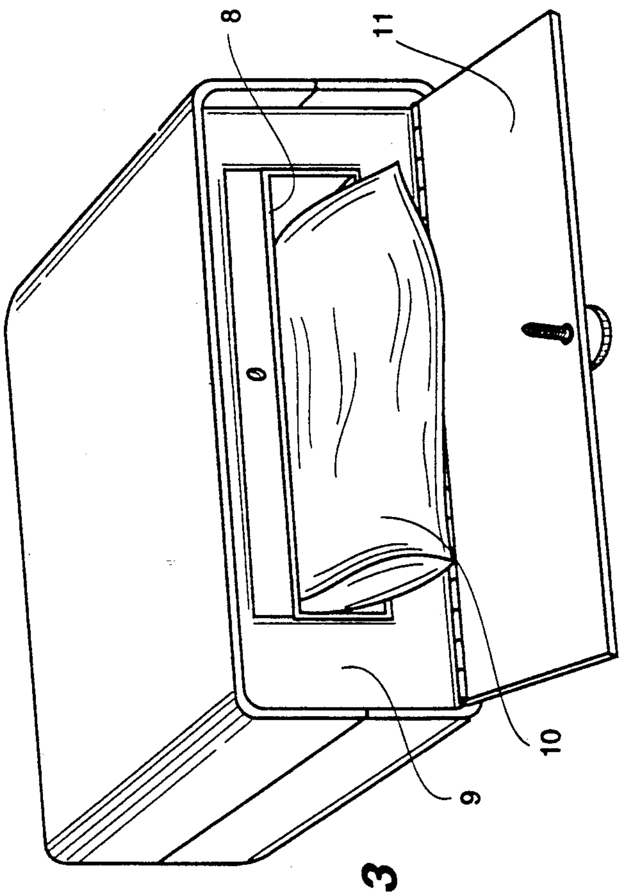
FIG. 3 is a perspective view of the Procxessor with a back wall thereof removed to show the interior of the Processor from its back side.

As shown in FIG. 3, Insulation 9 in the Processor 2 may be covered with plastic foil or cloth, for cosmetic reasons and to protect it against damage.

FIG. 3 shows the rear of the Processor 2 with a rear access door 11 in the fully open position. The inner surface of the door 11 is also covered with insulation, as is the inside of a front end 12 of the Processor 2. A thumb screw is mounted in the rear door 11 to enable an operator to open the rear door 11, partially or fully, to allow ambient air to enter the housing to cool the contents thereof.

We claim:

1. A temperature conditioner device for use with photographic equipment that uses self-developing film using the diffusion transfer process, said device comprising:
   - a processor including a thermal insulated housing having at least one opening in a wall of said housing for inserting an exposed photograph and at least one compartment for accommodating said photograph, means for controlling the internal temperature and means for measuring and indicating the internal temperature.

2. The temperature conditioning device of claim 1 further comprising a thermal case for receiving said processor.

3. The temperature conditioning device of claim 2 further including at least one spare film and means for warming up said thermal case received in said thermal insulated housing.

4. The temperature conditioning device of claim 2 further comprising means for measuring and indicating the internal temperature of said thermal case.

5. The temperature conditioning device of claim 4 wherein said temperature measuring and indicating means is an electric thermometer.

6. The temperature conditioning device of claim 4 wherein said means for indicating the internal temperature has an external read-out.

7. The temperature conditioning device of claim 2 wherein said means for warming up said thermal case includes at least one warming element, such as a hot pad, containing an air-activatable chemical substance for releasing heat.

8. The temperature conditioning device of claim 1 wherein said opening is a slot having a shape corresponding to the shape of an instant photograph.

9. The temperature conditioning device of claim 1 including a warming element and wherein said compartment for accommodating said photograph therein is located adjacent to said warming element.

10. The temperature conditioning device of claim 1 wherein said means for controlling the internal temperature of said processor include means for warming up the processor and means for cooling down the processor.

11. The temperature conditioning device of claim 10 wherein said means for warming up said processor includes at least one warming element, such as a hot pad, containing an air-activatable chemical substance for releasing heat and a metal device for holding said warming element.

12. The temperature conditioning device of claim 10 wherein said thermal insulated housing has a rear wall and means for cooling down said processor include an access door in said rear wall of said housing and a screw for adjusting said access door for a partially open position for controlling the flow of air into the processor.

13. The temperature conditioning device of claim 1, wherein said means for measuring and indicating the internal temperature of said processor having a temperature sensor located between said exposed photograph and a metal compartment containing a warming element and a temperature indicator located in the front side of said thermal insulated housing for external reading.

14. The temperature conditioning device of claim 1, wherein said means for measuring and indicating the internal temperature of said processor is an electronic thermometer.

15. The temperature conditioning device of claim 1, further comprising means for absorbing moisture in the part accommodating said exposed photograph.

16. The temperature conditioning device of claim 15 wherein said means for absorbing moisture comprises a drying-medium taken from the class comprising silica-gel and a piece of blotter paper.

* * * * *